United States Patent

Raleigh et al.

[11] Patent Number: 6,075,991
[45] Date of Patent: Jun. 13, 2000

[54] WIRELESS BASE STATION WITH NEAR-FAR GAIN COMPENSATION

[75] Inventors: Gregory G. Raleigh, El Granada; Michael A. Pollack, Cupertino, both of Calif.

[73] Assignee: Watkins-Johnson Company, Palo Alto, Calif.

[21] Appl. No.: 08/813,003

[22] Filed: Mar. 4, 1997

Related U.S. Application Data

[60] Provisional application No. 60/013,030, Mar. 8, 1996.

[51] Int. Cl.$^7$ .................................. H04B 7/00; H04B 1/06
[52] U.S. Cl. ........................ 455/450; 455/452; 455/561; 370/277
[58] Field of Search .................................... 455/452, 561, 455/562, 450, 449, 446, 456; 370/277

[56] References Cited

U.S. PATENT DOCUMENTS

| | | | |
|---|---|---|---|
| 4,509,206 | 4/1985 | Carpe et al. | 455/245 |
| 5,233,626 | 8/1993 | Ames | 375/1 |
| 5,285,165 | 2/1994 | Renfors et al. | 328/167 |
| 5,448,751 | 9/1995 | Takenaka et al. | 455/33.1 |
| 5,537,680 | 7/1996 | Bruno | 455/15 |
| 5,568,158 | 10/1996 | Gould | 343/756 |

FOREIGN PATENT DOCUMENTS

| | | |
|---|---|---|
| 56-17526A | 2/1981 | Japan . |
| 5617526 | 2/1981 | Japan . |
| 1-339102 | 11/1991 | Japan . |

*Primary Examiner*—Wellington Chin
*Assistant Examiner*—Sheila Smith
*Attorney, Agent, or Firm*—Flehr Hohbach Test Albritton & Herbert LLP

[57] ABSTRACT

A wireless base station receiver receives weak signals from mobile units at a first position using a first receiver configuration and strong signals from mobile units at a second position using a second receiver configuration. The base station receiver includes an input terminal to receive an inbound signal from each mobile unit. A diplexer is coupled to the input terminal and configured to receive the inbound signal and to pass a first frequency band of the inbound signal as a first signal, and to pass a second frequency band of the inbound signal as a second signal. An attenuator is coupled to the diplexer and configured to attenuate the second signal to create a third signal. A downconverter is coupled to the diplexer and the attenuator and configured to downconvert the first signal and the third signal to provide a downconverted inbound signal. An analog to digital converter coupled to the downconverter and configured to convert the down converted inbound signal to a digital signal. Advantages of the invention include the ability to compensate for the gain required to receive inbound signals from near and far mobile units.

20 Claims, 3 Drawing Sheets

WIRELESS BASE STATION WITH NEAR-FAR GAIN COMPENSATION

This application is cased on U.S. provisional patent application Ser. No. 06/013,030 filed Mar. 8, 1996.

FIELD

The invention relates to a wireless base station receiver with near-far gain compensation. In particular, the invention provides a first filter for far mobile units and a second filter for nearby mobile units in order to compensate for the gain required to receive inbound signals from near and far mobile units.

BACKGROUND

Wideband multi-channel receivers for wireless communications base stations is an emerging technology with the potential to increase network capacity and quality. These wideband receivers are capable of digitizing the entire spectrum designated for reverse link communications. The digitized spectrum contains the signals present on all the frequency channels in use for a frequency-division multiple access system. Each base station then selects and digitally processes those frequency channels which are assigned to that particular base station. The frequency channels processed by the base station are easily re-configured with software commands, allowing for base station frequency assignments to be changed easily, and even dynamically, in response to the changing load in the cellular system.

One potentially serious problem with the use of wideband receivers for wireless communications systems is that of receiver dynamic range limitations. Because the receiver must typically provide an equal amount of RF amplification to each of the frequency channels in the allotted cellular frequency band prior to the signal being applied to its analog to digital converter (ADC), it can be difficult to adequately process all of the desired channels if a large received power difference exists between the strongest and the weakest signals. For example, consider a wideband base station receiving signals from two mobile units in its cell, with one unit located very near the base station receiving antenna and one unit at the cell boundary, far from the base station receiving antenna. The difference in received signal power between the two users in likely to exceed 60 dB and may be as large 90 dB. Such scenarios are often referred to as the "near-far problem". If the gain of the receiver is adjusted so that the strong signal causes the ADC to output its full scale value, and if the instantaneous dynamic range of the receiver is insufficient, the weak signal is lost amid the ADC quantization noise and receiver's additive noise. Conversely, if the gain of the receiver is adjusted so that the weak signal is amplified above the receiver noise floor, and if the instantaneous dynamic range of the receiver is insufficient, the strong signal saturates the receiver's analog components and/or the ADC causing nonlinear distortion for all received channels. If the power level difference between the strongest signal and the weakest signal is 90 dB and a signal to noise ratio of 18 dB must be preserved for the weak signal, the wideband receiver would require an instantaneous dynamic range of at least 108 dB. In practice, an instantaneous dynamic range greater than 80 dB dynamic range is difficult to achieve. As a result, existing base station receivers lack the ability to compensate for the gain required to receive inbound signals from near and far mobile units.

SUMMARY

The invention relates to a wireless base station receiver with near-far gain compensation. In an exemplary embodiment, a wireless base station receiver receives weak signals from mobile units at a first position using a first receiver configuration and strong signals from mobile units at a second position using a second receiver configuration. The base station receiver includes an input terminal to receive an inbound signal from each mobile unit. A diplexer is coupled to the input terminal and configured to receive the inbound signal and to pass a first frequency band of the inbound signal as a first signal, and to pass a second frequency band of the inbound signal as a second signal. An attenuator is coupled to the diplexer and configured to attenuate the second signal to create a third signal. A downconverter is coupled to the diplexer and the attenuator and configured to downconvert the first signal and the third signal to provide a downconverted inbound signal. An analog to digital converter coupled to the downconverter and configured to convert the down converted inbound signal to a digital signal.

Advantages of the invention include the ability to compensate for the gain required to receive inbound signals from near and far mobile units.

BRIEF DESCRIPTION OF THE FIGURES

Additional advantages of the invention will become apparent upon reading the following detailed description and upon reference to the drawings, in which.

DETAILED DESCRIPTION

The invention relates to a wireless base station receiver with near-far gain compensation. In particular, the invention provides a first filter for far mobile units and a second filter for nearby mobile units in order to compensate for the gain required to receive inbound signals from near and far mobile units.

Cellular Communications

Figure 1:
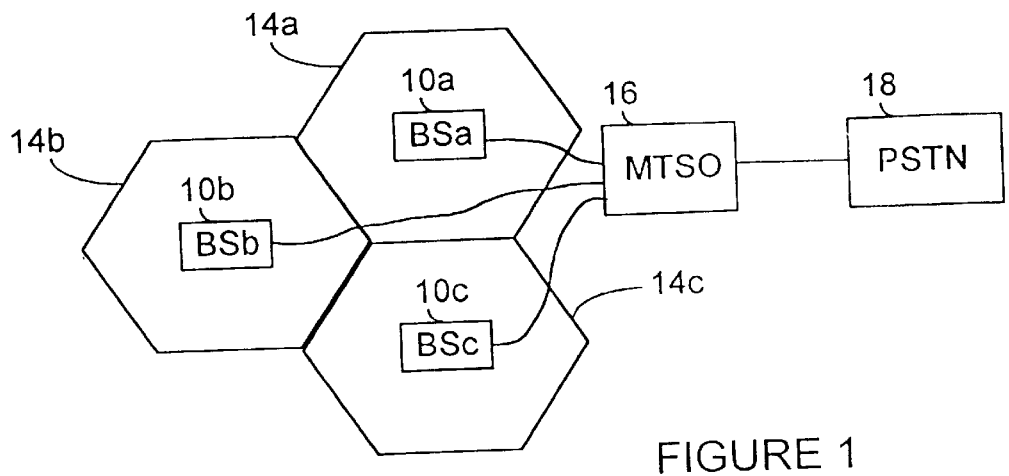
FIG. 1 depicts a plurality of cellular base stations coupled to a mobile telephone switching office and a public switched telephone network.

An exemplary embodiment is described with reference to FIGS. 1 to 6. FIG. 1 depicts a plurality of cellular base stations 10a–c each having a respective cell 14a–c. Each base station is responsible for communicating with any mobile units within their respective cells. A mobile telephone switching office (MTSO) 16 is coupled to the base stations 10a–c. The base stations 10a–c are responsible for receiving call initiations from mobile users and for requesting communication frequencies from the MTSO 16. The MTSO is responsible for allocating the frequency spectrum and for granting an assignment to a requesting base station. The MTSO is also coupled to a public switched telephone network 18 for communicating with other telephone equipment.

When a mobile unit moves from one cell to another, the MTSO is responsible for allocating a new frequency for the mobile unit and for informing the new base station of its responsibility for maintaining communication with that mobile unit.

Figure 2:
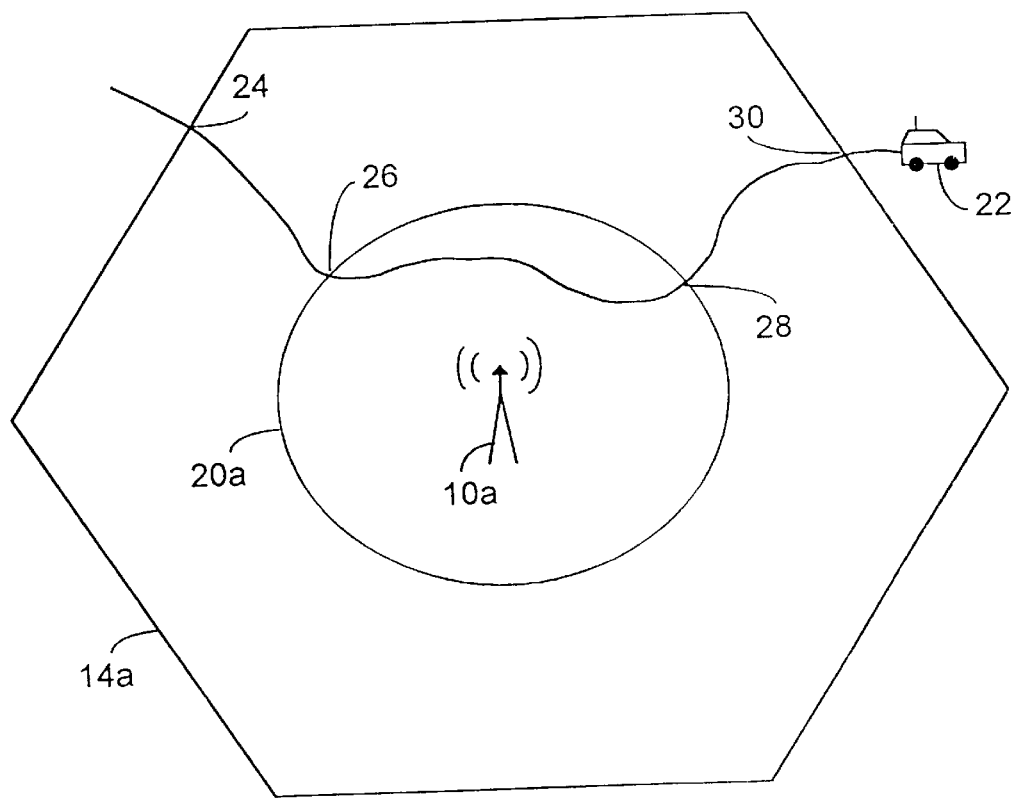
FIG. 2 depicts a cellular base station and a mobile unit within the cell.

The invention further provides a technique for improving communication with mobile units within each cell to compensate for the near-far problem described above. FIG. 2 depicts a typical cellular base station 10a that communicates with a mobile unit 22 while the mobile unit is within cell 14a. However, as explained above, the base station receives a weak signal when the mobile unit is at position 24 entering the cell, and a strong signal at position 26 within a strong signal boundary 20a. While the mobile unit is within the strong signal boundary 20a, the base station receives a strong signal that may overwhelm the base station amplifier or analog to digital converter. When the mobile unit moves out of the strong signal boundary, at position 28, the base station again receives a weak signal. When the mobile unit reaches point 30, the mobile unit is handed of to an adjacent cellular base station. The invention provides a technique for compensating for the weak signal and the strong signal indicative of the near-far problem.

Figure 3:
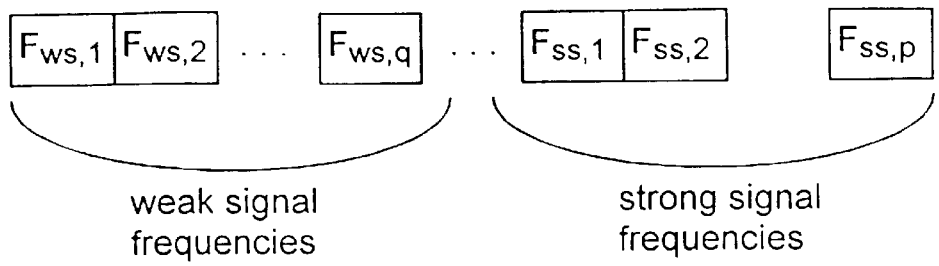
FIG. 3 depicts a first series of weak signal frequencies and a second series of strong signal frequencies.

An exemplary technique involves dividing up the set of frequencies assigned to the base station into two contiguous sets of frequencies, one set of p "strong signal" frequencies $\{F_{ss,1}\ F_{ss,2}\ ...\ F_{ss,p}\}$ and one set of q "weak signal" frequencies $\{F_{ws,1}\ F_{ws,2}\ ...\ F_{ws,q}\}$ as shown in FIG. 3. FIG. 3 only depicts the frequencies assigned to a particular cell. Thus, $N_r-1$ (where $N_r$ is the frequency re-use cluster size) frequency channels exist between each frequency depicted in FIG. 3 which are assigned to other base stations within the system. Each mobile in communication with the base station is assigned a frequency according to the strength of its signal at the base station. The signal strength indicator (SSI) is a measurement that made and stored by conventional cellular communications systems known in the art. Ordinarily mobiles are assigned channels within the "weak signal" set of frequencies $\{F_{ws}\}$. As soon as the signal from any of the mobile units is determined by the base station to be above a certain threshold, that particular mobile unit is reassigned to one of the channels in the "strong signal" set of frequencies $\{F_{ss}\}$. This is because, mobile units generally come into a cell at a cell boundary as a weak signal and may venture close enough to the base station to enter the strong signal boundary.

Figure 4:
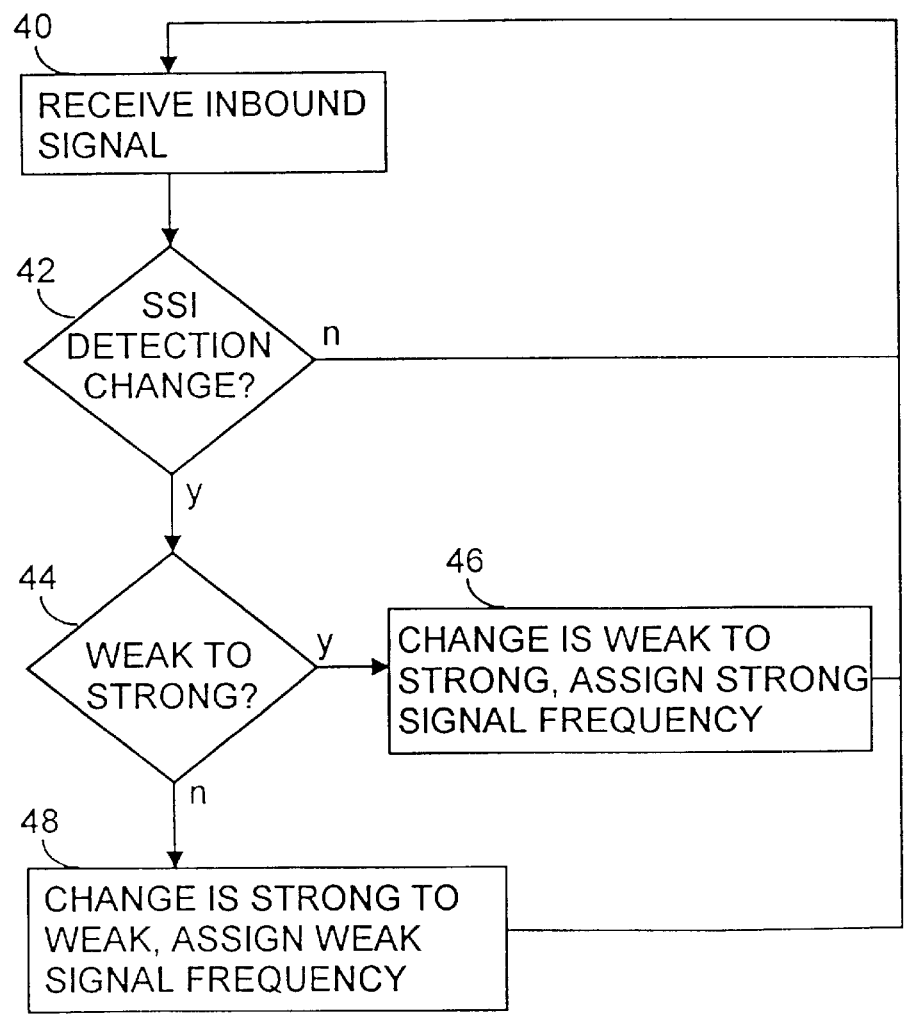
FIG. 4 is a flowchart for assigning signal frequencies to mobile units.

FIG. 4 is a flowchart that depicts the function for assigning frequencies to mobile units. In step 40, inbound signals are received by the base station and the signal strength is ascertained as the SSI. Step 42 compares the SSI against a predetermined threshold. The threshold is a function of the receiver and can include factors such as the receiver dynamic range and the analog to digital converter scale and noise quantization. If no change in the SSI is detected, the mobile unit continues to communicate on the same assigned frequency. However, if a change is detected, step 44 determines whether the change was from weak to strong. If the change was from weak to strong, step 46 assigns a strong signal frequency to the mobile unit. If, however, the change was from strong to weak, step 48 assigns a weak signal frequency to the mobile unit.

To expand on the FIG. 4 flowchart, several points are clarified. The determination as to whether or not a particular mobile unit is designated a strong-signal mobile is made by the base station communicating with the mobile. Once a mobile unit is designated "strong-signal", the base station commands the mobile unit to tune to a new frequency channel, potentially without notifying the MTSO. Consider the scenario depicted in FIG. 2. At position 24, the mobile unit 22 travels from a neighboring cell into cell 14a and the mobile call is handed off to base station 10a. The mobile unit and the base station begin communicating over the frequency channel designated by the MTSO at the time of the hand-off, $F_{ws,i}$. At position 24, the mobile unit is far from the base station and thus the base station receives a weak signal from the mobile unit. The mobile unit continues to travel through the cell 14a in the general direction of the base station antenna, and as it does, the base station receives an increasingly powerful signal (on average) from the mobile unit. By the time the mobile unit reaches position 26 and enters the strong signal boundary 20a, the base station determines that the mobile unit is considered a strong-signal station.

Upon making the determination that the mobile unit is a strong-signal station, the base station instructs the mobile unit, using the hand-off protocols dictated by the cellular standard which is deployed throughout the cellular network, to tune to a new frequency channel within the set of frequencies reserved for high-power mobiles, $\{F_{ss}\}$. Communications with the mobile unit continue uninterrupted on the new frequency channel. The base station manages the assignment of mobiles to (and from) its pool of strong-signal frequency channels without involvement of the MTSO. MTSO involvement is avoided by assigning a small number of fixed channels to each base station. The base station never relinquishes control of these channels to the MTSO even when they are not being used. In some cases, it is advantageous to obtain a set of reserved high power frequencies without informing the MTSO of the need for such channels. This would be the case, for example, if changing the MTSO frequency plan involved a difficult or costly procedure. While there are many methods for obtaining extra frequencies at a base station, one particular method involves setting up a pseudo telephone call to a pre-assigned mobile phone number. After setting up the pseudo call, the base station could then provide simulated call information to the MTSO while re-assigning the frequency channel to another active mobile.

The criterion used for making that determination can be based on any one of a number of schemes. For example, a mobile unit may be designated a strong-signal mobile once the average received power from a given mobile unit exceeds a certain predetermined threshold. Or alternatively, one may choose to keep the strong-signal channels filled, with the q mobile units with the highest average received signal powers occupying the set of strong signal frequency channels. Or, One may choose to keep the strong-signal channels filled, with the q mobile units with the highest average received signal powers occupying the set of strong signal frequency channels. Or, one may choose to have mobile unit change frequency channels only if a situation arises in which dynamic range of the received signals exceed the capabilities of the $\{F_{ws}\}$ path in the receiver. The last approach would, of course, minimize the number of frequency hand-offs that a mobile unit is likely to experience.

The mobile unit continues traveling through the cell until it reaches position 22, which time the base station determines that the average power of the mobile unit has dropped sufficiently that the mobile unit is no longer considered a strong-signal mobile. At that time the base station instructs the mobile unit to tune back to $F_{ws,i}$, the same channel it was using originally when it entered the cell at point 18. Since the MTSO was never made aware of the intracell hand-off that occurred at point 20, it would have assumed that channel $F_{ws,i}$ was continually in use and therefore it would not have assigned it to another mobile unit. Thus, the mobile's original channel is certain to be available when the mobile unit in question leaves the strong-signal region at point 22.

When the mobile unit reaches point 24, the base station determines that it cannot sustain communication with the mobile unit and initiates a hand-off request with the MTSO. Since the mobile unit is operating on the frequency it was assigned as it entered the cell, the hand-off proceeds in accordance with conventional protocols.

In implementing the above technique to ameliorate the near-far problem, some amount of cellular call capacity is sacrificed. The reason being that q frequencies must be reserved for strong-signal users which are therefore not available to the MTSO to sustain additional calls. Various factors must be taken into account what fraction of the total number of channels should be reserved as strong-signal channels in order to meet the network's quality of service criteria, for example, the radii of the cells within the system, the dynamic range of the receivers used at the base stations, and the number of mobile units expected to be serviced within each cell. It is anticipated that a small number of reserved channels, even as few as one or two channels, may result in substantial easing of the base station receiver's dynamic range requirements when used in conjunction with the technique described above.

It is worth noting that the strong-signal frequency sets $\{F_{ss}\}$ can be assigned with a smaller frequency re-use factor among cells than the weak-signal frequency sets $\{F_{ws}\}$. This is because a higher (absolute) level of co-channel interference can be tolerated on channels where we can guarantee that the base station is receiving a large amount of power from the mobile units: by definition, the strong-signal frequencies.

One implementation would be particularly suited to our existing transceiver designs would designated the prime band (i.e. A' band or B' band) as the set of strong-signal frequency channels. Consider the SAW filter banks in the B band units, which are presently set up to select the B band in one path and to select the B' band in the other path. The filter bank could easily be modified so that the B' band path is attenuated relative to the B band path before the two paths are recombined. This approach would be especially attractive in older systems within which the prime band channels are not assigned to calls by the MTSO.

Receiver Architecture

Figure 5:
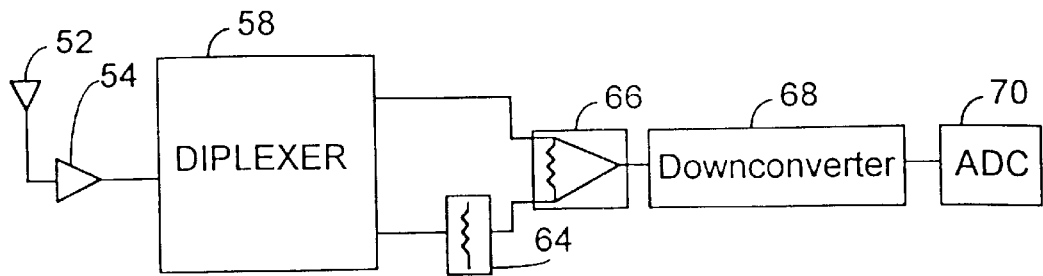
FIG. 5 depicts a receiver according to an embodiment of the invention suitable for simultaneously communicating with near and far mobile units.

Referring to FIG. 5, the receiver electronics are designed to provide the base station with compensation for the near and far mobile units. The base station antenna 52 is coupled to a pre-amplifier to provide an inbound RF signal that can be filtered. A diplexer 58 is coupled to the pre-amplifier and is configured to separate the weak signal frequencies from the strong signal frequencies as shown in FIG. 3. This function is performed using filters that are tuned to separate the frequencies of interest. One of the diplexer outputs contain only the weak signal frequencies $\{F_{ws}\}$ while the other diplexer outputs contains only the strong signal frequencies $\{F_{ss}\}$. The signal path containing the strong signal frequencies is delivered to attenuator 64 to reduce the power level of the strong signals. Then the weak signals and strong signals are combined in RF power combiner 66. The recombined signal possesses a reduced dynamic range as compared with the original input signal spectrum. The resulting RF signal is downconverted by downconverter 42 and then converted from analog to digital by analog to digital converter 44. The resulting digital signal is delivered to signal processing hardware and and software to extract the inbound information.

Figure 6:
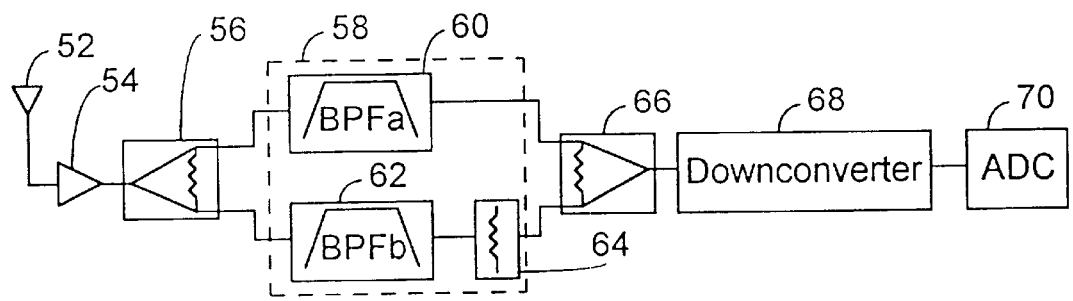
FIG. 6 depicts an implementation of the receiver of FIG. 5.

A second implementation is depicted FIG. 6 where the diplexer 58 is shown to contain a power divider 56 that splits the inbound signal and delivers the inbound signal to a first band pass filter (BPFa) 60 that filters the weak signal frequencies and a second band pass filter (BPFb) 62 that filters the strong signal frequencies.

Conclusion

Advantages of the invention include the ability to compensate for the gain required to receive inbound signals from near and far mobile units.

Having disclosed an exemplary embodiment and the best mode, modifications and variations may be made to the disclosed embodiment while remaining within the scope of the present invention as defined by the following claims.

What is claimed is:

1. A wireless base station receiver for receiving weak signals from mobile units at a first position using a first receiver configuration and strong signals from mobile units at a second position using a second receiver configuration, said base station receiver comprising:

an input terminal to receive an inbound signal from each of said mobile units;

a diplexer coupled to said input terminal and configured to receive said inbound signal and pass to a first frequency band of said inbound signal as a first signal, and to pass a second frequency band of said inbound signal as a second signal, wherein the first frequency band is associated with far mobile units, and the second frequency band is associated with near mobile units;

a downconverter coupled to said diplexer and configured to downconvert said first signal and said second signal to provide a downconverted inbound signal;

an analog to digital converter coupled to said downconverter and configured to convert said down converted inbound signal to a digital signal; and a processor coupled to said analog to digital converter and configured to receive said digital signal, and configured to assign each mobile unit a weak signal frequency in said first frequency band when the mobile unit has a weak signal strength, and assign each mobile unit a strong signal frequency in said second frequency band when the mobile unit has a strong signal strength.

2. The wireless base station receiver of claim 1, further comprising:

an attenuator positioned between said diplexer and said downconverter and configured to attenuate said second signal.

3. The wireless base station of claim 2, further comprising:

a received signal strength circuit configured to provide an RSSI signal for each of said mobile units, wherein said processor is coupled to said received signal strength circuit and configured to detect changes in each RSSI signal compared to a predetermined threshold and to instruct a mobile unit to change frequencies when an RSSI signal associated with a mobile unit crosses said predetermined threshold.

4. The wireless base station of claim 3, wherein:

said diplexer is configured to filter said first frequency band and said second frequency band, where said first frequency band and said second frequency band are different.

5. The wireless base station of claim 2, wherein said diplexer comprises:

a first filter coupled to said input terminal and configured to receive said inbound signal and to pass a first frequency band of said inbound signal as a first signal; and a second filter coupled to said input terminal and configured to receive said inbound signal and to pass a second frequency band of said inbound signal as a second signal.

6. The wireless base station of claim 5, wherein:
said first filter is configured to filter said first frequency band associated with far mobile units and said second filter is configured to filter said second frequency band associated with near mobile units.

7. The wireless base station of claim 6, wherein:
said first filter is configured to filter said first frequency band and said second filter is configured to filter said second frequency band, where said first frequency band and said second frequency band are different.

8. A method of receiving inbound signals from mobile units, said method comprising the steps of:
associating a first frequency band with far mobile units;
associating a second frequency band with near mobile units;
receiving a first signal from a far mobile unit and downconverting said first signal;
receiving a second signal from a near mobile unit, attenuating said second signal to create a third signal;
combining said first signal and said third signal to create a fourth signal;
downconverting said fourth signal to create a fifth signal;
converting said fifth signal to a digital signal;
receiving a signal strength signal for each of said mobile units;
detecting changes in each said RSSI signal compared to a predetermined threshold; and
instructing a mobile unit to change frequencies when the RSSI signal associated with a mobile unit crosses said predetermined threshold;
assigning each mobile unit with weak signal strength a weak signal frequency in said first frequency band;
assigning mobile units with strong signal strength a strong signal frequency in said second frequency band.

9. A method of communicating between a base station and mobile units within a cell, said method comprising the steps of:
associating a first frequency band with far mobile units;
associating a second frequency band with near mobile units;
receiving an inbound signal from each mobile unit within the cell and detecting a signal strength for each inbound signal;
assigning each mobile unit with weak signal strength a weak signal frequency in said first frequency band;
assigning mobile units with strong signal strength a strong signal frequency in said second frequency band;
placing a pseudo telephone call for a mobile unit when the signal strength from said mobile unit crosses a predetermined threshold from a weak signal strength to a strong signal strength;
obtaining a strong signal frequency for said mobile unit based on said pseudo telephone call; and
assigning said strong signal frequency to said mobile unit.

10. A method of communicating between a base station and mobile units within a cell, said method comprising the steps of:
associating a first frequency band with far mobile units;
associating a second frequency band with near mobile units;

receiving an inbound signal from each mobile unit within the cell and detecting a signal strength for each inbound signal;
assigning each mobile unit with weak signal strength a weak signal frequency in said first frequency band;
assigning mobile units with strong signal strength a strong signal frequency in said second frequency band;
placing a pseudo telephone call for a mobile unit when the signal strength from said mobile unit crosses a predetermined threshold from a strong signal strength to a weak signal strength;
obtaining a weak signal frequency for said mobile unit based on said pseudo telephone call; and
assigning said weak signal frequency to said mobile unit.

11. The method of claim 9, further comprising the steps of:
when the signal strength from said mobile unit crosses the threshold from a strong signal strength to a weak signal strength, reassigning said weak signal frequency to said mobile unit.

12. The method of claim 10, further comprising the steps of:
when the signal strength from said mobile unit crosses the threshold from a weak signal strength to a strong signal strength, reassigning said strong signal frequency to said mobile unit.

13. A wireless base station receiver for receiving weak signals from mobile units at a first position using a first receiver configuration and strong signals from mobile units at a second position using a second receiver configuration, said base station receiver comprising:
an input terminal to receive an inbound signal from each of said mobile units;
a diplexer coupled to said input terminal and configured to receive said inbound signal and pass to a first frequency band of said inbound signal as a first signal, and to pass a second frequency band of said inbound signal as a second signal;
a downconverter coupled to said diplexer and configured to downconvert said first signal and said second signal to provide a downconverted inbound signal;
an analog to digital converter coupled to said downconverter and configured to convert said down converted inbound signal to a digital signal;
a received signal strength circuit configured to provide an RSSI signal for each of said mobile units; and
a processor coupled to said analog to digital converter and configured to receive said digital signal, and coupled to said received signal strength circuit and configured to detect changes in each RSSI signal compared to a predetermined threshold and to instruct a mobile unit to change frequencies when an RSSI signal associated with the mobile unit crosses said predetermined thresholds and the processor is configured to initiate communication with new mobile units at a weak signal frequency.

14. A method of receiving inbound signals from mobile units, said method comprising the steps of:
receiving a first signal from a far mobile unit and downconverting said first signal;
receiving a second signal from a near mobile unit, attenuating said second signal to create a third signal;
combining said first signal and said third signal to create a fourth signal;

downconverting said fourth signal to create a fifth signal;
converting said fifth signal to a digital signal;
receiving a signal strength signal for each of said mobile units;
detecting changes in each said RSSI signal compared to a predetermined threshold; and
instructing a mobile unit to change frequencies when the RSSI signal associated with a mobile unit crosses said predetermined threshold; and
initiating communication with new mobile units at a weak signal frequency.

15. The wireless base station receiver of claim 13, further comprising:
an attenuator positioned between said diplexer and said downconverter and configured to attenuate said second signal.

16. The wireless base station of claim 15, wherein:
said diplexer is configured to filter said first frequency band associated with far mobile units and said second frequency band associated with near mobile units.

17. The wireless base station of claim 16, wherein:
said diplexer is configured to filter said first frequency band and said second frequency band, where said first frequency band and said second frequency band are different.

18. The wireless base station of claim 15, wherein said diplexer comprises:
a first filter coupled to said input terminal and configured to receive said inbound signal and to pass a first frequency band of said inbound signal as a first signal; and
a second filter coupled to said input terminal and configured to receive said inbound signal and to pass a second frequency band of said inbound signal as a second signal.

19. The wireless base station of claim 18, wherein:
said first filter is configured to filter said first frequency band associated with far mobile units and said second filter is configured to filter said second frequency band associated with near mobile units.

20. The wireless base station of claim 19, wherein:
said first filter is configured to filter said first frequency band and said second filter is configured to filter said second frequency band, where said first frequency band and said second frequency band are different.

* * * * *